Jan. 10, 1967  E. GRECK  3,297,130
METHOD AND APPARATUS FOR ORIENTING ARTICLES
Filed Jan. 13, 1964  2 Sheets-Sheet 1
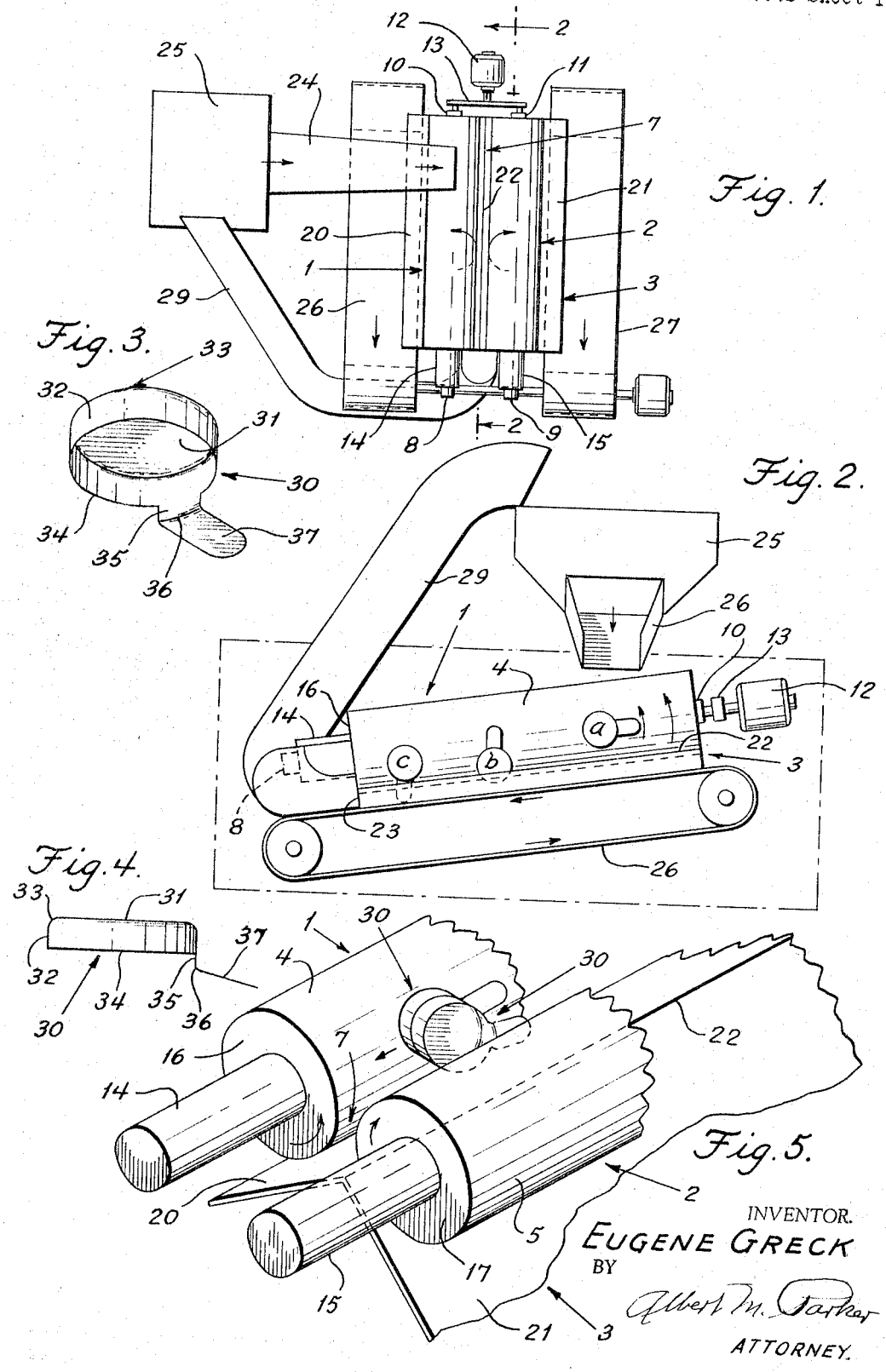
INVENTOR.
EUGENE GRECK
BY
ATTORNEY.

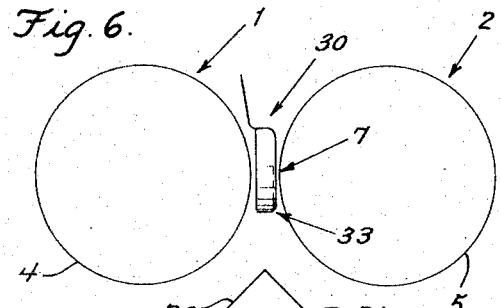
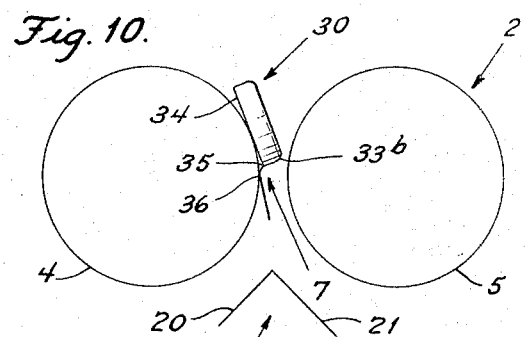
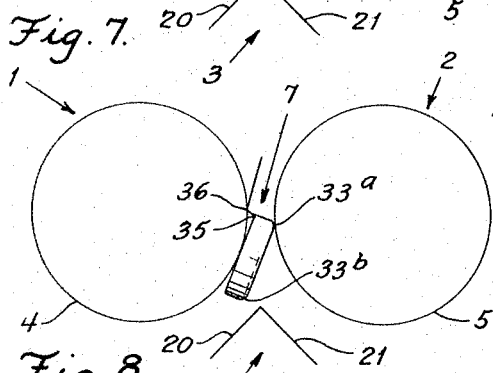
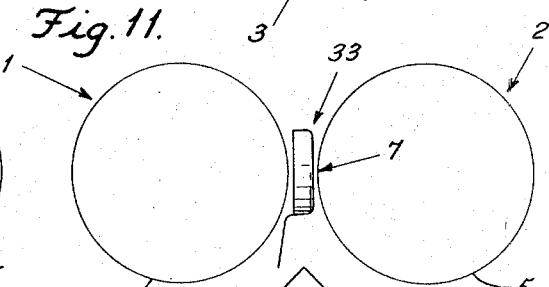
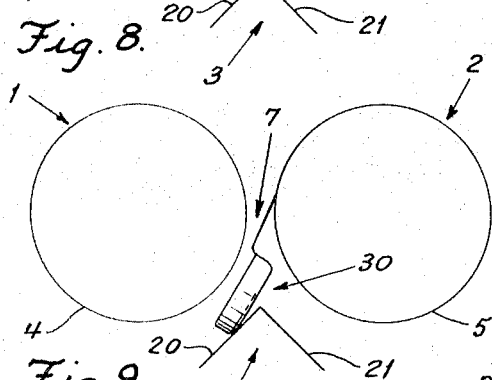
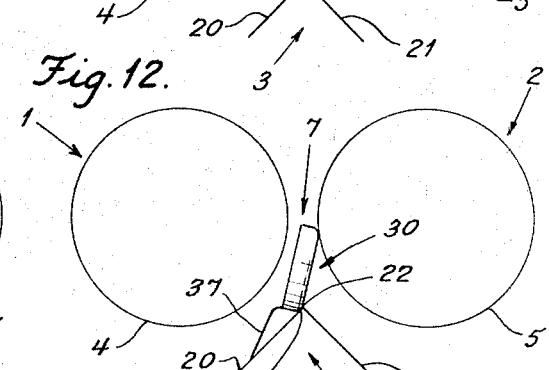
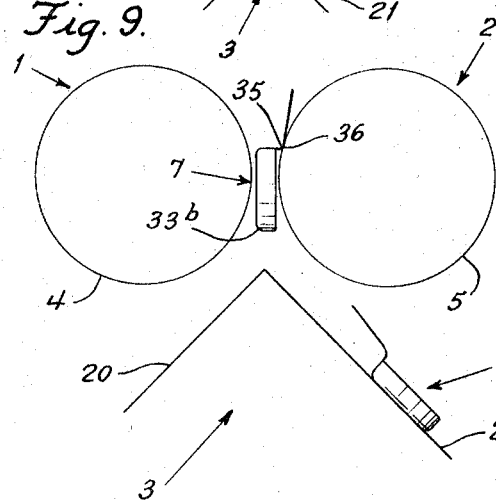
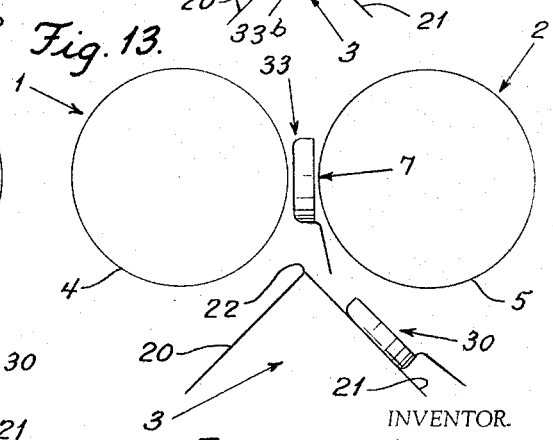

United States Patent Office 3,297,130
Patented Jan. 10, 1967

3,297,130
METHOD AND APPARATUS FOR
ORIENTING ARTICLES
Eugene Greck, Westfield, N.J., assignor to American
Flange & Manufacturing Co., Inc., New York, N.Y.,
a corporation of Delaware
Filed Jan. 13, 1964, Ser. No. 337,472
8 Claims. (Cl. 198—33)

This invention relates to a method and apparatus for feeding and orienting articles and is particularly concerned with such a method and apparatus for relatively high speed orienting of articles which are otherwise difficult to handle because of their shape and general physical characteristics.

The problem of feeding and properly orienting articles is one which is becoming increasingly acute as automated manufacturing and assembling lines operate at progressively higher speeds. Although the type of equipment heretofore employed in the feeding and orienting of relatively small, bulk handled, articles has been developed to a high degree, there are certain respects in which it is still almost wholly deficient. One instance is where small, lightweight unsymmetrical parts have to all be properly oriented at high speed in such a manner as to have no damaging effect on them. Parts feeders of the vibratory type have been suggested as a solution but the orienting of parts solely by means of vibratory motion has several inherent limitations not the least of which is speed. Having the same drawback as to speed are those devices which generally through some mechanical arrangement, feed and orient the parts as individuals.

One approach to the problem of achieving higher feeding rates of such symmetrical parts has been to group a plurality of conventional lower speed devices together. Although this method results in multiplying total output, it has the obvious disadvantage of multiplying total cost and total working space required. Further, merging the output of each unit into a single source or track, as is often required, may present a major problem in itself.

The method and apparatus of the invention, as here illustrated and described, provide an improvement in the specific field of transferring closure caps from one operation to another during their manufacture and application. This would include properly orienting such caps in completing the manufacture of them as they proceed, for instance, to the gasketing operation. Also included is the orienting of such caps as they are fed from bulk storage into a capping machine which applies the caps to filled bottles. These closure caps, as hereinafter referred to, are lightweight sheet metal structures having a disc-like top and a depending skirt therearound resulting in a cup-shaped article having a flat circular top surface and an open cupped interior surface. Further, the cap is provided with a gripping ear which first extends a short distance downwardly of said skirt at its free edge and then extends radially away from the cap at a slightly downward angle. These particular caps formed from lightweight sheet metal may vary in size over a wide range depending upon the bottle or other container it is desired to cap.

The term "orienting" has two aspects as applied to the closure cap or part here being dealt with. Firstly all caps must be oriented about a transverse axis so that their interior cupped surfaces all face in one direction, such as open side up. Secondly each cap must also be oriented about its central axis so its ear points in a predetermined direction such as ear trailing. It is the first aspect, or surface orienting, which has heretofore presented a major obstacle to high speed handling of such parts and to which the invention is directed.

Since the cap here considered has itself been developed into a marketable item especially suited for the capping of beer and soft drink bottles a concentrated effort is being made to adapt high speed bottling lines to handle it. This effort was directed on one hand to develop new machinery and, on the other hand, to modify existing machinery for feeding and orienting this closure cap at least at existing bottling speeds and hopefully to increase these speeds up into the 1000 per minute range. Numerous experienced manufacturers in the field of special handling equipment have unequivocally refused to work on a solution to the problem due to the handling difficulties created by such factors as the asymmetrical configuration of the part due to the existence of the gripping ear, and the general inherent instability of such lightweight parts making them difficult to handle at high speed to begin with. Of the manufacturers that have made an attempt at solving the problem, none so far has come forth with a practical solution.

The method of the invention presents a solution to the problem of surface orienting the above described parts at speeds high enough to keep up with high speed industrial apparatus. In addition the advantages of simplicity and economy are embodied in the apparatus herein disclosed for carrying out that method.

It is accordingly a principal object of this invention to provide a new and improved method for orienting articles.

Another object is to provide apparatus for carrying out that method.

Another object is to provide a method and apparatus for feeding and orienting radially asymmetric articles at relatively high speed.

A further object is to provide a method and apparatus for orienting radially unsymmetrical shaped cupped articles so their cupped formations all have the same orientation.

A more detailed object is to provide a method and apparatus for orienting cup-shaped closure caps having radially extending gripping ears so that they are all faced with the same side up.

A further detailed object is to effect such orienting of cup-shaped closure caps while feeding them at high speed.

Further and more detailed objects will be partly obvious and partly pointed out as the description of the invention, taken in conjunction with the accompanying drawing proceeds.

In that drawing:

FIG. 1 is a top plan view of the article orienting and feeding apparatus of the invention and for carrying out the method thereof.

FIG. 2 is a sectional view taken on lines 2—2 of FIG. 1 and looking in the direction of the arrows.

FIG. 3 is a perspective view of a closure cap for the orienting of which the method and the apparatus of the invention are particularly applicable.

FIG. 4 is a side elevation of the closure cap of FIG. 3.

FIG. 5 is an enlarged fragmentary perspective view of the lower end of the rollers and deflector member of the invention showing a pair of caps in opposed relationship between those rollers.

FIG. 6 shows the initial step of the method of the invention being performed on a cap with its cupped interior facing to the left and with the ear trailing.

FIG. 7 is a view similar to FIG. 6 but with the cap being subjected to the next step.

FIG. 8 shows the subsequent step with the cap of FIG. 6 being deflected to its oriented position.

FIG. 9 illustrates the method of the invention being performed on caps facing to the right and with their ears trailing.

FIG. 10 shows the initial step of the method of the invention being performed on a cap with its cupped interior facing to the left and with the ear leading.

FIG. 11 is a view similar to FIG. 10 but with the cap being subjected to the next step.

FIG. 12 shows the subsequent step with the cap of FIG. 10 being deflected to its oriented position.

FIG. 13 is a view similar to FIG. 9 but with the method of the invention being performed on caps facing to the right and with their ears leading.

Considering first the apparatus of the invention and for carrying out the method thereof as generally as shown in FIGS. 1, 2, and 5, it can be seen that the principal parts thereof comprise a pair of substantially cylindrical rollers indicated generally at 1 and 2 and a deflector member generally indicated at 3. These three members and their cooperative relationship form the real essence of the invention and such will accordingly be described in full detail hereinafter. However, continuing with the structural aspects of the invention, it is seen that the rollers 1 and 2 are disposed in parallel relationship with their axis lying in a plane inclined upwardly at an angle from the horizontal. The rollers 1 and 2 are formed with smooth peripheral surfaces 4 and 5 respectively and they are spaced from each other a predetermined distance as indicated by the slot or channel 7. The rollers 1 and 2 are journaled in a suitable supporting structure at their lower ends 8 and 9 while their upper ends are similarly supported as indicated at 10 and 11. A motor 12 is operatively connected by means of a drive mechanism 13 to the extending axle portions of the rollers 1 and 2 in such manner as to rotate the rollers in opposite direction to cause their top surface portions to move away from each other as indicated by the curved arrows in FIGS. 1 and 5. Adjacent their lower ends 8 and 9, the rollers 1 and 2 have relatively short portions 14 and 15 of reduced diameter. As clearly shown in FIG. 5 where these reduced portions extend from the full diameter portions of the rollers then leave annular end surfaces 16 and 17 on the rollers 1 and 2.

Turning now to the detail of the deflector member 3, it is clearly seen in FIG. 5 as being a longitudinal member extending along beneath the rollers 1 and 2 and as having an inverted V-shaped vertical cross-sectional configuration. This configuration is formed by a pair of inclined surfaces 20 and 21 which meet at an apex line 22. The apex 22 is aligned with the mid-position between the rollers 1 and 2 but is in spaced parallel relationship below the same. In this particular form of the invention, an included angle of 90 degrees between the surfaces 20 and 21 has been found to give good results, however, this angle may be varied without departing from the scope of the invention depending upon the particular article it is desired to orient. Another factor which may be varied to give optimum efficiency with different articles is the vertical distance between the line or apex 22 and the midposition line between the rollers 1 and 2.

The deflector member 3 preferably extends throughout the effective length of the rollers so as to utilize the full length of the same. The lower end 23 of the deflector member however terminates in line with the annular roller surfaces 16 and 17 so that only those articles passing between the peripheral surfaces 4 and 5 of the rollers are permitted to come in contact with the deflector member 3.

The articles to be oriented are advantageously metered out of the bulk storage hopper 25 onto a chute 24 which discharges the articles into the area of the slot or channel 7 between the rollers 1 and 2 in toward the upper ends of those rollers. As the articles move downwardly along the rollers due to their inclination, the orienting function takes effect by allowing the articles to drop into the slot 7 between the rollers and come into contact with the deflecting member 3. The articles, depending upon their orientation, that is, the direction in which their open cups face, as they pass through the slot 7, will then be deflected to one side or the other of the apex 22 and will then continue properly oriented down the surfaces 20 and 21 of the deflector. The articles so oriented are then discharged from the respective deflecting surfaces 20 and 21 onto respective conveyor or chute devices such as is indicated at 26 and 27 in FIG. 1 which carry them away.

Those articles which for any reason fail to drop into the slot 7 are cleared from the rollers upon reaching the end surfaces 16 and 17 at which point they are permitted to drop between the reduced roller portions 14 and 15 regardless of their orientation. A recycle conduit or conveyor indicated at 29 is provided for returning such unoriented articles to the supply hopper 25.

FIGS. 3 and 4 show a closure cap which is one type of article the method and apparatus of the invention are particularly suited for handling. The cap as illustrated and generally indicated by the numeral 30 is formed from thin sheet metal such as aluminum and comprises a disc-like top 31 surrounded by a depending skirt 32, the top and skirt being joined by an annular radiused portion generally indicated at 33. The cap skirt 32 terminates in a lower free edge 34 and a gripping ear extends downwardly from a portion of that lower edge for a short distance as indicated at 35. At the lower end of the portion 35 the ear turns outwardly at 36 into an ear portion 37 continuing outwardly and away from the cap skirt at a small downwardly directed angle.

As stated earlier, the specific problem with which the method and apparatus of the invention are concerned is that of orienting closure caps, as just described, so that their interior or cupped surfaces all face in the same direction. The closure cap 30 has two outstanding features which have caused failure of prior attempts to carry out the above described orientation at high speed. The radially asymmetric configuration of the closure cap caused by the laterally extending gripping ear right away precludes the use of conventional high speed equipment such as is used in the handling of symmetric cup-shaped articles such as crown seals and lug or screw caps. Secondly the inherent instability of the instant closure caps due to their very lightweight construction makes any handling of them at high speed difficult. Not only do these particular articles have a strong tendency to flutter and bounce around when propelled at relatively high speed but they are also susceptible to damage when subjected to severe tumbling or other similar types of action employed by existing high speed handling equipment.

Considering now in detail the various steps the caps go through in arriving at their oriented positions, attention is directed to FIGS. 6 through 13. To begin with, to set up the orienting device of the invention to handle the closure cap articles 30 as described above, the rollers 1 and 2 must be adjusted so that the slot or channel 7 between their adjacent peripheral surfaces is slightly less than the overall height of the cap 30 as viewed in FIG. 4. In other words, the vertical distance from the tip of the ear portion 37 to the top surface of the cap top 31 is greater than the horizontal distance 7 between the rollers. Given this relationship, it can be seen that it is impossible for the cap 30 to drop freely in a straight vertical path between the rollers. To pass through they have to tilt one way or another. Accordingly those caps which happen to fall into the slot 7 with ears extending substantially parallel to the longitudinal axis of the rollers 1 and 2 will hang up at that point since they cannot pass between the rollers in this position. However, the rotational movement imparted to the rollers 1 and 2 causes the caps 30, due to their irregular shape, to rotate slightly until their ears assume a position substantially perpendicular to the longitudinal axis of the roller. These various cap positions are illustrated in the showing of FIG. 2 wherein *a* indicates a cap which has become momentarily lodged between the rollers with its ear extending parallel thereto and toward the upper end of the rollers. The rotational movement of the rollers will rotate this cap causing its ear to swing up to an ear trailing position as indicated by the curved arrow and by the cap shown at *b*. Similarly if the cap is deposited between the rollers with its ear directed toward the lower end of the rollers, the roller rotation will also rotate the cap into the *b* position. If a cap is deposited in the *c* position, it can pass down between the rollers without being rotated. Both of the *b* and *c* positions are acceptable for the selective orientation to follow and the caps have to be in one or the other of these positions to pass through between the rollers.

In FIG 6 there is shown the commencement of orientation of a cap 30 located in ear trailing position and having its cupped interior surface facing to the left as viewed in the plane of the paper. As the leading portion of the cap enters the slot or channel 7, where the distance between the peripheries of the two rollers is at a minimum, the cap will assume a substantially vertical position. This vertical alignment will be brought about regardless of the cap orientation upon initial contact with the rollers which includes sliding down either of rollers 1 or 2 on its skirt edge 34, or sliding down either roller on its flat top 31, or dropping vertically into the slot 7. As pointed out earlier, however, the cap cannot fall in a vertical path all the way through the path between the rollers since the minimum width of the slot 7 between the rollers is less than the overall height of the cap as viewed in FIG. 4.

Proceeding then to the next orienting step as seen in FIG. 7, it is noted that as the downwardly extending ear portion 35 approaches the slot 7, the radiused portion 33 of the cap contacts roller 2 at the position 33*a* and the outwardly turned ear portion 36 contacts roller 1. The leading portion of the cap indicated at 33*b* is swung to the left as the cap follows a curved path down between the rollers. It is essential that the cap be swung in this manner in order for it to pass through the rollers in the ear trailing position. Having been swung into the position shown, the cap as its ear passes through the slot 7, drops free onto the inclined surface 20 of the deflecting member 3 as illustrated in FIG. 8. Accordingly all caps which drop into the slot 7 with their ears trailing and their interior cupped surfaces facing to the left are deflected so as to drop onto the inclined surface 20 and to slide away beneath the rollers with their interior cupped surfaces facing upwardly. FIG. 9 shows how caps also in the ear trailing position but with their interior cupped surfaces facing to the right are deflected in a similar manner but ride down the incline 21 properly oriented. The only difference between this showing and that of FIGS. 6–8 is that here the leading cap portions 33*b* are swung to the right by orienting steps otherwise the same as those of FIGS. 6, 7 and 8. The scheme of these two showings disposes of all caps which are introduced between the rollers with their ears trailing.

Considering now those caps which enter the space 7 between the rollers in the ear leading position as shown in FIGS. 10 through 13, FIG. 10 illustrates the initial position a cap assumes upon entering the slot 7 in ear leading position and with its interior cupped surface facing to the left. With the ear leading, the cap cannot assume a vertical position as when the ear is trailing but instead is supported on roller 1 with the skirt end edge surface 34 and the outwardly curved portion 36 of the ear engaged with the roller surface. The portion 33*b* of the cap radiused portion 33 is now leading and shortly comes into contact with the peripheral surface 5 of roller 2. Here again the cap must follow a curved path in order to get the cap ear through the slot 7. Having curved its way between the rollers however, the cap momentarily, as seen in FIG. 11, is free to drop vertically. When it does so its leading ear portion 37 first contacts the inclined surface 20 causing the cap to be deflected to the left. Looking at FIG. 12 it can be seen that as the ear slides down the inclined surface 20 the cap body moves downwardly and to the left enough so that the leading part 33*b* of the cap just clears the apex 22 and also comes into contact with the inclined surface 20. The cap being now properly oriented with its interior cupped surface facing upwardly continues down the incline 20 and away from the rollers.

FIG. 13 shows how caps also in the ear leading position but with their interior cupped surfaces facing to the right are similarly deflected down the incline 21 properly oriented. Again the only difference between this showing and that of FIGS. 10–12 is that the cap ear portions 37 are deflected to the right with the cap following to the right down the incline 21. This then disposes of all caps which pass between the rollers with their ears leading.

In summary, the caps, randomly oriented, are dropped onto the upper surfaces of the rollers which are rotating away from each other. All separate caps which fall into the slot 7 will be rotated slightly due to the rotation of the rollers and will pass between the rollers in an ear leading or ear trailing position to be properly oriented as above described. Only those caps which may become nested within each other, as illustrated in FIG. 5, will fail to drop through the slot 7 so will be conveyed lengthwise of the rollers, due to the roller inclination. These doubled or nested caps will, however, drop between the reduced end portions 14 and 15 for recycling. Even though most of the caps are rotated somewhat by the action of the rollers, the time consumed in doing so is not of much consequence. Hence the caps move down very quickly, almost as if they are falling freely, so the face orientation of the invention is quickly accomplished. This makes for the high speed needed.

Accordingly, the method and apparatus above described provide a step forward in the art of surface orienting radially asymmetric articles at high speed. It is to be kept in mind, however, that though the method and apparatus of the invention have been described with respect to a particular article, they are by no means limited solely to the orienting of closure caps. Numerous other articles possessed of generally similar characteristics to those of the closure caps herein described could be oriented by following the method and by utilizing apparatus generally similar to that herein described. Various dimensions and spatial relationships of the orienting device may be varied without departing from the scope of the invention. These relationships could include for instance the diameter of the rollers, the horizontal spacing of the rollers and the vertical spacing and angular formation of the deflecting member. Any of these factors might be varied in employing the orienting concept of the invention to other and different articles. It is accordingly to be understood that the structures and relationships of apparatus as well as article handled shown in the accompanying drawing and described in the foregoing description are to be considered as illustrative of the invention and are not set forth in a limiting sense.

Having described my invention, what I claim is new and desire to secure by Letters Patent is:

1. Apparatus for surface orienting articles having a flat disc-like top surface, a cylindrical skirt depending therearound forming an interior cupped surface and an ear extending downwardly and radially outwardly away from the lower free edge of said skirt, comprising a pair of identical longitudinally extending members disposed in parallel relationship, each of said members including a hard, smooth, continuous surface, said surfaces being horizontally spaced from each other a distance less than the overall height of the cap and greater than the height of said skirt, and a longitudinally extending deflecting element extending parallel to said members and vertically spaced beneath the midpoint between said members a distance no greater than the maximum overall diameter of the cap.

2. Apparatus for surface orienting closure caps as in claim 1, and including means for imparting surface movement to said longitudinally extending members.

3. Apparatus for surface orienting closure caps as in claim 1, wherein said longitudinally extending members and said deflecting element are inclined with respect to the horizontal and the lower ends of said longitudinally extending members are reduced in cross-section so as to provide a discharge space therebetween substantially greater than said space between said surfaces.

4. Apparatus for surface orienting unsymmetric articles comprising a pair of identical longitudinally extending cylindrical members disposed in parallel relationship, each of said members including a hard, polished surface, said surfaces being horizontally spaced from each other, means for imparting counter-rotational movement to said respective cylindrical surfaces so that the adjacent surfaces of said members move upwardly away from each other, and a longitudinally extending deflecting element extending parallel to said members, said deflecting element being formed of a pair of surface members and being of inverted V-shape in vertical cross-section, the apex of said V-shape deflecting element being aligned with and being vertically spaced below midposition between said cylindrical members so that each of said surface members is adapted to receive and orient articles passing between said members.

5. The method of surface orienting disc-like articles having a radically unsymmetric portion and having a substantially greater diameter than thickness and having opposite faces of two different types of face characteristics which comprises, causing said articles to fall randomly oriented between spaced upwardly moving surfaces, rotating said articles by engagement with said surfaces to radially align said unsymmetric portions of all of said articles in one or the other of two opposite positions, causing said articles to pass between said surfaces radially aligned, and as said articles emerge from between said surfaces, directing all of said articles with face characteristics of one type to one side of the path between said surfaces and all of said articles with face characteristics of the other type to the other side of said path.

6. Apparatus for surface orienting unsymmetric articles as in claim 5, discharge means at one end of said longitudinally extending member and means for conveying the articles along said members toward said discharge means.

7. The method of orienting closure caps having a flat disc-like top surface, a cylindrical skirt depending therearound forming an interior cupped surface and an open area, and an ear extending downwardly and radially outwardly away from the lower free edge of said skirt comprising the steps of simultaneously moving a plurality of said caps along a predetermined path and simultaneously orienting each of said caps into a common plane at an angle to said predetermined path so that the disc-like surface of each cap is disposed in said plane, and simultaneously with the moving of said caps along said predetermined path orienting the ear portion on each cap to a position substantially perpendicular to said predetermined path, and as soon as each cap is properly oriented feeding the same away from said predetermined path along paths to dispose each said cap positioned on its disc-like surface and its open area facing outwardly.

8. The method of orienting closure caps having a flat disc-like top surface, a cylindrical skirt depending therearound forming an interior cupped surface and an open area, and an ear extending downwardly and radially outwardly away from the lower free edge of said skirt, comprising the steps of simultaneously moving a plurality of said caps along a first path and simultaneously orienting each of said caps into a common plane at an angle to said first path so that the disc-like surface of each cap is disposed in said plane and wherein the open area of each of said caps is at random facing in a first direction or an opposite second direction, and simultaneously with the moving of said cap in said first path orienting the ear portion on each cap to a position substantially perpendicular to said first path, and as soon as each cap is properly oriented feeding such caps having open areas facing in said first direction in a second path away from said first path and feeding such caps having open areas facing in said second direction in a third path away from said first path, and depositing all caps from said second and third paths in a fourth path whereby each of said caps are positioned on its disc-like surface and its open area facing outwardly.

References Cited by the Examiner
UNITED STATES PATENTS
1,425,374  8/1922  Elgy.
3,123,198  3/1964  Hohl _____ 198—33

EVON C. BLUNK, *Primary Examiner.*

WILLIAM B. LA BORDE, *Examiner.*

R. E. KRISHER, A. C. HODGSON, *Assistant Examiners.*

UNITED STATES PATENT OFFICE
CERTIFICATE OF CORRECTION

Patent No. 3,297,130                 January 10, 1967

Eugene Greck

It is hereby certified that error appears in the above numbered patent requiring correction and that the said Letters Patent should read as corrected below.

Column 7, line 48, for the claim reference numeral "5" read -- 4 --.

Signed and sealed this 24th day of October 1967.

(SEAL)
Attest:

Edward M. Fletcher, Jr.
Attesting Officer

EDWARD J. BRENNER
Commissioner of Patents